United States Patent
Yoshida

(10) Patent No.: US 6,804,021 B1
(45) Date of Patent: Oct. 12, 2004

(54) FACSIMILE APPARATUS, CONTROL METHOD THEREFOR, AND COMPUTER-READABLE STORAGE MEDIUM

(75) Inventor: Takehiro Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/417,048

(22) Filed: Oct. 13, 1999

(30) Foreign Application Priority Data

Oct. 13, 1998 (JP) .......................................... 10-290952

(51) Int. Cl.$^7$ .............................................. G06F 15/00
(52) U.S. Cl. ....................... 358/1.15; 358/402; 358/468; 379/100.01
(58) Field of Search ............................... 358/1.15, 402, 358/442, 468, 405, 404, 444, 400; 379/100.01, 88.17, 93.24, 93.15

(56) References Cited

U.S. PATENT DOCUMENTS

| | | | | |
|---|---|---|---|---|
| 5,521,719 A | * | 5/1996 | Yamada | 358/438 |
| 5,608,786 A | * | 3/1997 | Gordon | 379/100 |
| 5,767,985 A | * | 6/1998 | Yamamoto et al. | 358/402 |
| 5,848,415 A | * | 12/1998 | Guck | 707/10 |
| 5,862,202 A | * | 1/1999 | Bashoura et al. | 379/100.14 |
| 5,892,591 A | * | 4/1999 | Anglin, Jr. et al. | 358/407 |
| 5,907,598 A | * | 5/1999 | Mandalia et al. | 379/100.01 |
| 5,943,140 A | * | 8/1999 | Monroe | 358/442 |
| 6,005,677 A | * | 12/1999 | Suzuki | 358/442 |
| 6,009,153 A | * | 12/1999 | Houghton et al. | 379/102.02 |
| 6,023,345 A | * | 2/2000 | Bloomfield | 358/402 |
| 6,061,146 A | * | 5/2000 | Mori | 358/403 |
| 6,088,125 A | * | 7/2000 | Okada et al. | 358/405 |
| 6,097,797 A | * | 8/2000 | Oseto | 379/100.08 |
| 6,185,288 B1 | * | 2/2001 | Wong | 379/219 |
| 6,211,972 B1 | * | 4/2001 | Okutomi et al. | 358/402 |
| 6,259,533 B1 | * | 7/2001 | Toyoda et al. | 358/1.15 |
| 6,310,942 B1 | * | 10/2001 | Bashoura et al. | 379/100.14 |

OTHER PUBLICATIONS

U.S. patent application Ser. No. 09/417,068, filed Oct. 13, 1999.
U.S. patent application Ser. No. 09/324,505, filed Jun. 3, 1999.
U.S. patent application Ser. No. 08/997,789, filed Dec. 24, 1997.

* cited by examiner

*Primary Examiner*—Mark Wallerson
(74) *Attorney, Agent, or Firm*—Fitzpatrick, Cella, Harper & Scinto

(57) ABSTRACT

When image data converted into a predetermined file format is communicated via the Internet (IT) but does not reach a target calling destination, the image data is communicated using only a PSTN. When the partner apparatus cannot interpret the contents of the received data, unconverted image data is communicated via the IT. When IT communication of converted image data or IT communication of unconverted image data to a given calling destination fails, the communication route is managed by the statuses of a plurality of internal flags for each calling destination in a calling destination registration unit (26) so as not to select the unsuccessful communication route in next and subsequent communication operations.

13 Claims, 9 Drawing Sheets

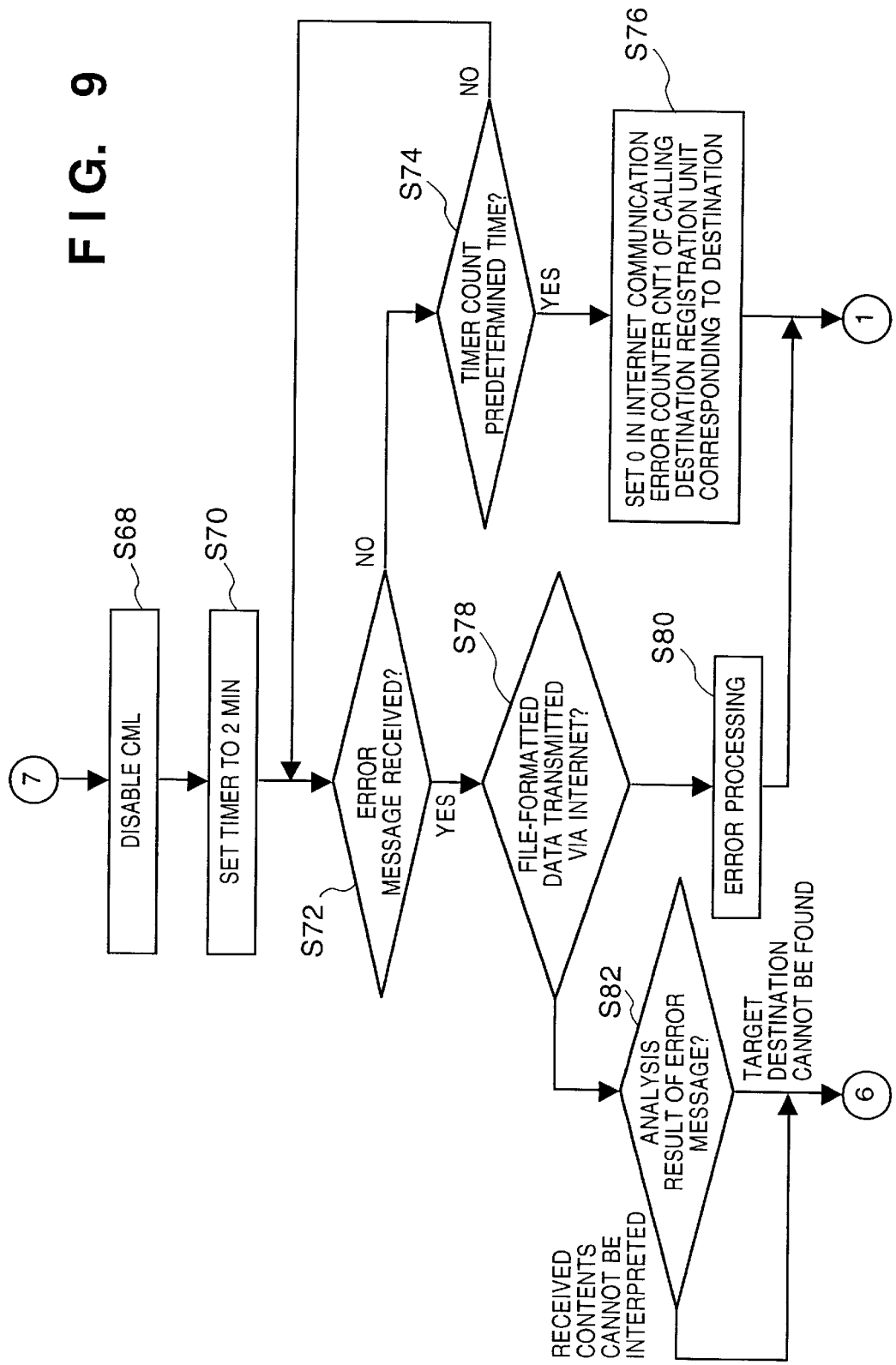

US 6,804,021 B1

FACSIMILE APPARATUS, CONTROL METHOD THEREFOR, AND COMPUTER-READABLE STORAGE MEDIUM

BACKGROUND OF THE INVENTION

1. Field of the Invention

The present invention relates to a facsimile apparatus capable of performing facsimile communication via the Internet, control method therefor, and computer-readable storage medium.

2. Description of the Related Art

In recent years, facsimile apparatuses capable of performing facsimile communication via the Internet have been proposed. In facsimile communication, this facsimile apparatus converts data to be transmitted into a predetermined file format, and transmits the converted data via the Internet.

However, the file-formatted data may not reach a target destination. Even if the data reaches the target destination apparatus, this partner apparatus may not interpret the data.

To solve these problems, when no reception confirmation is obtained from the destination (receiving-side) apparatus upon executing facsimile communication via the Internet, only a public switched telephone network (PSTN) is used for the same destination in subsequent facsimile communication.

However, the shift to communication using only the PSTN is not preferable to effectively use the Internet.

SUMMARY OF THE INVENTION

It is an object of the present invention to provide a facsimile apparatus capable of reducing the communication cost by efficiently using the Internet, control method therefor, and computer-readable storage medium.

To achieve the above object, a facsimile apparatus according to the present invention comprises the following arrangement.

That is, a facsimile apparatus capable of performing facsimile communication via the Internet, comprises communication means capable of communicating image data converted into a predetermined file format or unconverted image data via the Internet, and control means for changing a data communication form by the communication means on the basis of data received from an external device at a calling destination.

For example, when the image data converted into the file format cannot be transmitted to a target calling destination by communication via the Internet, the control means preferably changes the data communication form to the calling destination by the communication means into a data communication form in which image data not converted into the file format is transmitted.

When the image data converted into the file format is communicated via the Internet and the data received from the external device at the calling destination represents that contents of the image data cannot be interpreted, the control means preferably changes the data communication form to the calling destination by the communication means into a data communication form in which image data not converted into the file format is transmitted.

The communication means can communicate using a telephone network, and when a target calling destination cannot be detected by communication via the Internet, the control means preferably changes the data communication form to the calling destination by the communication means into a data communication form using only the telephone network.

The communication means can communicate using a telephone network, and when the data received from the external device at the calling destination represents that contents of the image data transmitted via the Internet cannot be interpreted, the control means preferably changes the data communication form to the calling destination by the communication means into a data communication form using only the telephone network.

To achieve the above object, a control method for a facsimile apparatus according to the present invention comprises the following steps.

That is, a control method for a facsimile apparatus capable of performing facsimile communication via the Internet, comprises the step of changing a data communication form on the basis of data received from an external device at a calling destination in communicating image data converted into a predetermined file format or unconverted image data via the Internet.

When the image data converted into the file format cannot be transmitted to a target calling destination by communication via the Internet, or when the image data converted into the file format is communicated via the Internet and the data received from the external device at the calling destination represents that contents of the image data cannot be interpreted, the data communication form to the calling destination is preferably changed into a data communication form in which image data not converted into the file format is transmitted.

Further, there is provided a computer-readable storage medium capable of realizing the arrangement of the facsimile apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 9 is a flow chart showing communication network selection control in the control unit according to the embodiment of the present invention.

DETAILED DESCRIPTION OF THE PREFERRED EMBODIMENT

A preferred embodiment of a facsimile apparatus according to the present invention will be described in detail below with reference to the accompanying drawings.

Figure 1:
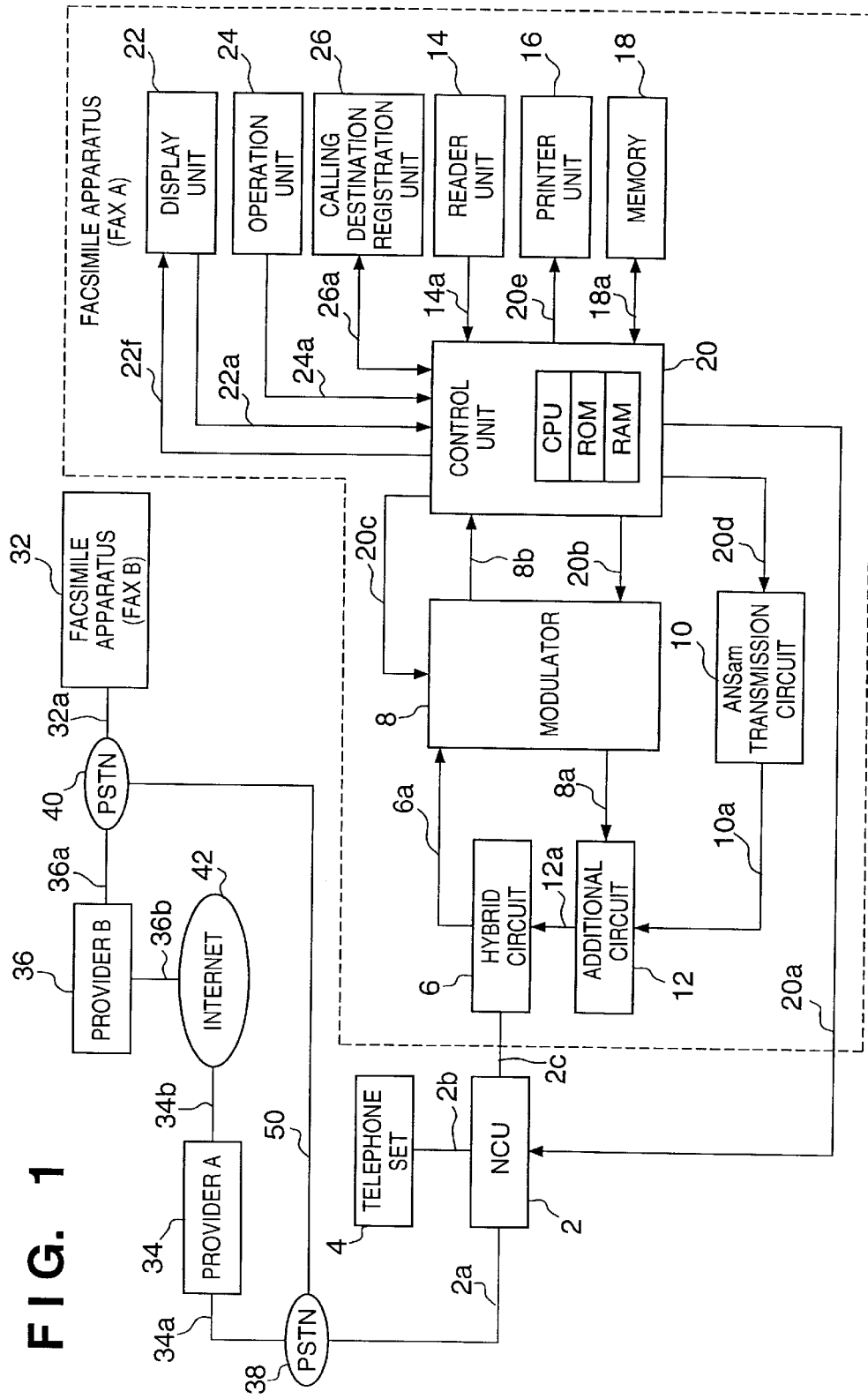
FIG. 1 is a block diagram showing the whole arrangement of a facsimile system including a facsimile apparatus according to an embodiment of the present invention.

FIG. 1 is a block diagram showing the whole arrangement of a facsimile system including a facsimile apparatus according to an embodiment of the present invention. The arrangement of a facsimile apparatus (FAX) A connected to this system is shown within the broken frame.

In FIG. 1, reference numeral 2 denotes an NCU (Net Control Unit) which is connected to a public switched telephone network (PSTN) 38 and telephone line terminal (telephone set 4), and controls connection to the public switched telephone network, switching to a data communication path, and holding of the loop in order to use the PSTN for data communication and the like. The NCU 2 connects a telephone line 2a to the telephone set side if a signal level output from a control unit 20 (to be described later) via a signal line 20a is "0", and to the facsimile apparatus side if the signal level is "1". In a normal state, the telephone line 2a is connected to the telephone set side.

The facsimile system comprises the telephone set 4. Reference numeral 6 denotes a hybrid circuit for separating a signal of transmission system and a signal of reception system by a general method, transmitting a transmission signal from an adder circuit 12 (to be described later) to the telephone line 2a via the NCU 2, and receiving a reception signal from a partner side via the NCU 2 to transmit the reception signal to a modulator/demodulator 8 (to be described later) via a signal line 6a.

The modulator/demodulator 8 modulates/demodulates data based on the ITU-T recommendations V.8, V.21, V.27 ter, V.29, V.17, and V.34. The modulator/demodulator 8 modulates transmission data output to a signal line 20b to output the modulated data to a signal line 8a, and demodulates reception data output to the signal line 6a to output the demodulated data to a signal line 8b. The transmission mode of the modulator/demodulator 8 is designated in accordance with a signal output from the control unit 20 (to be described later) via a signal line 20c.

Reference numeral 10 denotes an ANSam output circuit for transmitting an ANSam (amplitude-modulated answerback tone) signal based on the ITU-T recommendation. The ANSam output circuit 10 outputs the ANSam signal to a signal line 10a when a signal of signal level "1" is output to a signal line 20d, and does not output any signal to the signal line 10a when a signal of signal level "0" is output to the signal line 20d.

The adder circuit 12 receives information on the signal line 8a and information on the signal line 10a, and outputs the sum of these pieces of input information to a signal line 12a.

Reference numeral 14 denotes a reader unit for outputting to a signal line 14a image data obtained by reading an original set on an original table (not shown) by general procedures.

Reference numeral 16 denotes a printer unit for linesequentially printing information output to a signal line 20e.

Reference numeral 18 denotes a memory for storing image data read by the reader unit 14, data obtained by encoding the image data, externally received data, data obtained by decoding the received data, and the like.

Reference numeral 24 denotes an operation unit which includes a one-touch dial key, abbreviated dial key, ten-key pad, * and # keys, set key, start key, stop key, registration key for registering the telephone number of a calling destination, and various function keys, and outputs a pulse signal to a signal line 24a in accordance with a pressed key.

Reference numeral 22 denotes a display unit for displaying a key input on the operation unit 24, the current communication state, and the like.

Reference numeral 26 denotes a calling destination registration unit for registering data about partners (a plurality of target destination apparatus) for facsimile communication by the facsimile apparatus A. For example, the calling destination registration unit 26 stores, via a signal line 26a in correspondence with one-touch dial keys (not shown) of the operation unit 24, the telephone number of a calling destination communicated using only the PSTN, the telephone set and IP address of a calling destination to be dialed up, and data representing inhibition of facsimile communication via the Internet and inhibition of facsimile communication via the Internet for data formatted in a predetermined file format.

In this case, the predetermined file format is a BFT (Binary File Transfer) format.

Reference numeral 32 denotes a facsimile apparatus (FAX B); 34, an Internet service provider (to be referred to as a provider) A; 36, a provider B; 38 and 40, PSTNs; and 42, the Internet.

Reference numeral 50 denotes a telephone line which connects the PSTNs 38 and 40.

The facsimile apparatus A comprises the control unit 20 which controls the respective units of the facsimile apparatus A. As will be described later, the control unit 20 has a function of converting data to be transmitted into a predetermined file format, a function of transmitting the converted data, a function of, when an error message is received from a receiving-side apparatus, changing the calling method for next and subsequent operations in accordance with the contents of the error message, a function of performing facsimile communication using only the PSTN for a destination apparatus when this target receiving-side (destination) apparatus cannot be found by a predetermined number of facsimile communication operations via the Internet, and a function of facsimile-communicating unformatted data via the Internet to a destination apparatus when this receiving-side apparatus cannot interpret the contents of file-formatted data.

In facsimile communication using only the PSTN, the control unit 20 determines whether to convert data to be transmitted into a predetermined file format on the basis of the reception capability of a receiving-side facsimile apparatus. Data about the reception capability is stored in advance in a facsimile database 54 (to be described later) of a provider in the arrangement shown in FIG. 2.

The control unit 20 is constituted by a CPU for controlling the whole facsimile apparatus A in accordance with programs, ROM storing the programs and control codes of the CPU, and RAM having a work area used when the CPU executes control, and areas for various tables and the like.

Figure 2:
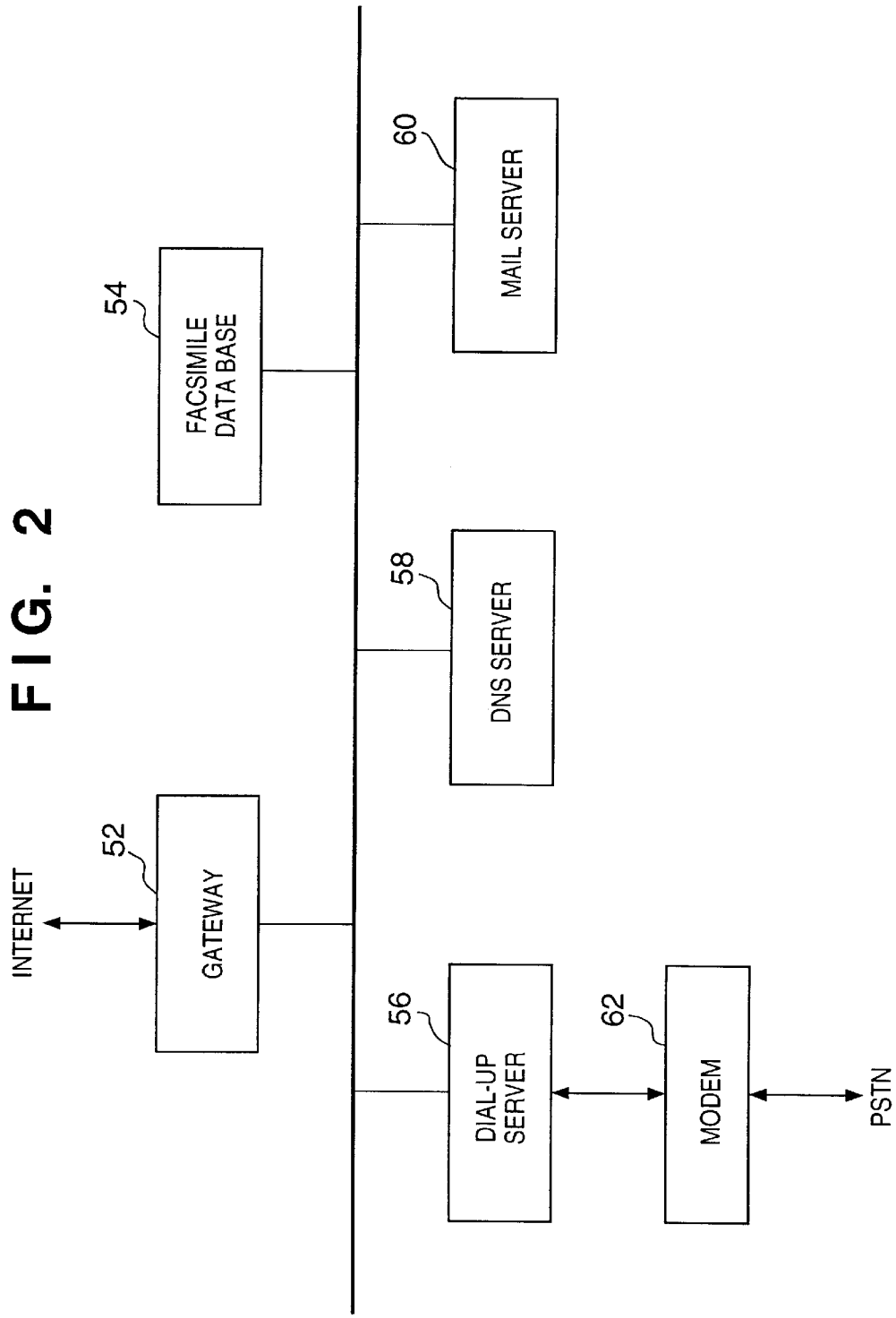
FIG. 2 is a block diagram showing the arrangement of a provider included in the facsimile system according to the embodiment of the present invention.
Figure 3:
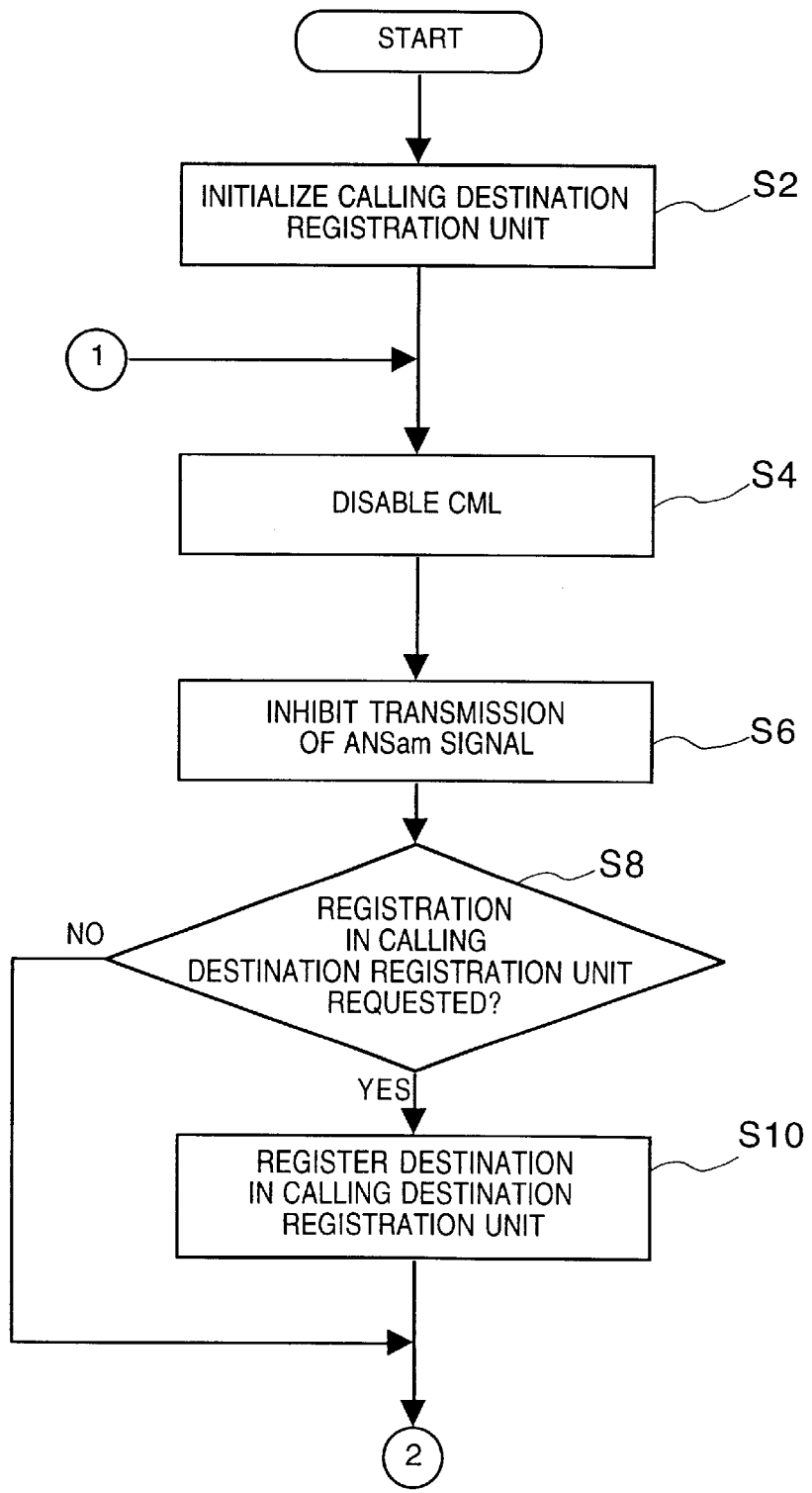
FIG. 3 is a flow chart showing communication network selection control in a control unit according to the embodiment of the present invention.
Figure 4:
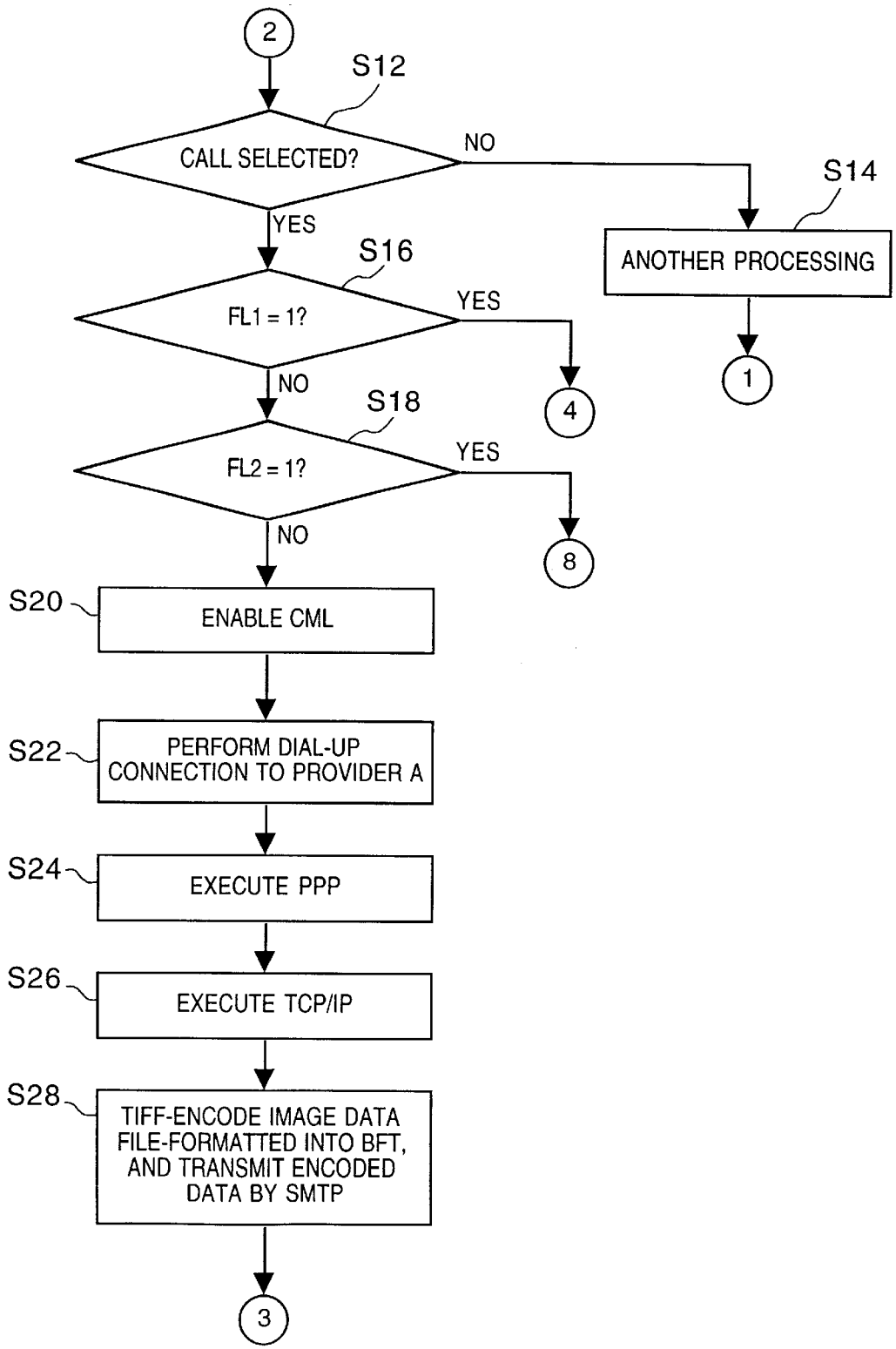
FIG. 4 is a flow chart showing communication network selection control in the control unit according to the embodiment of the present invention.
Figure 5:
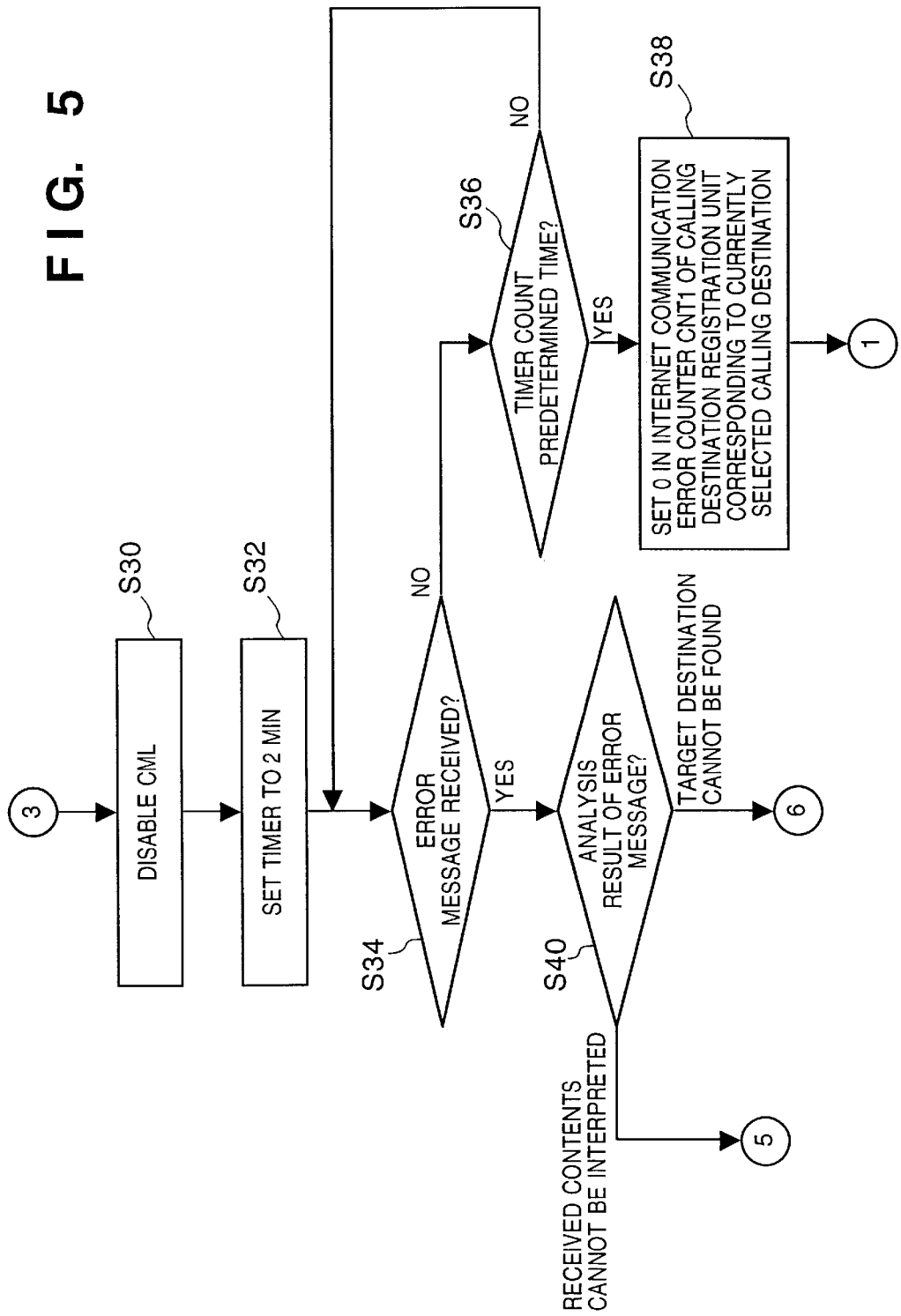
FIG. 5 is a flow chart showing communication network selection control in the control unit according to the embodiment of the present invention.
Figure 6:
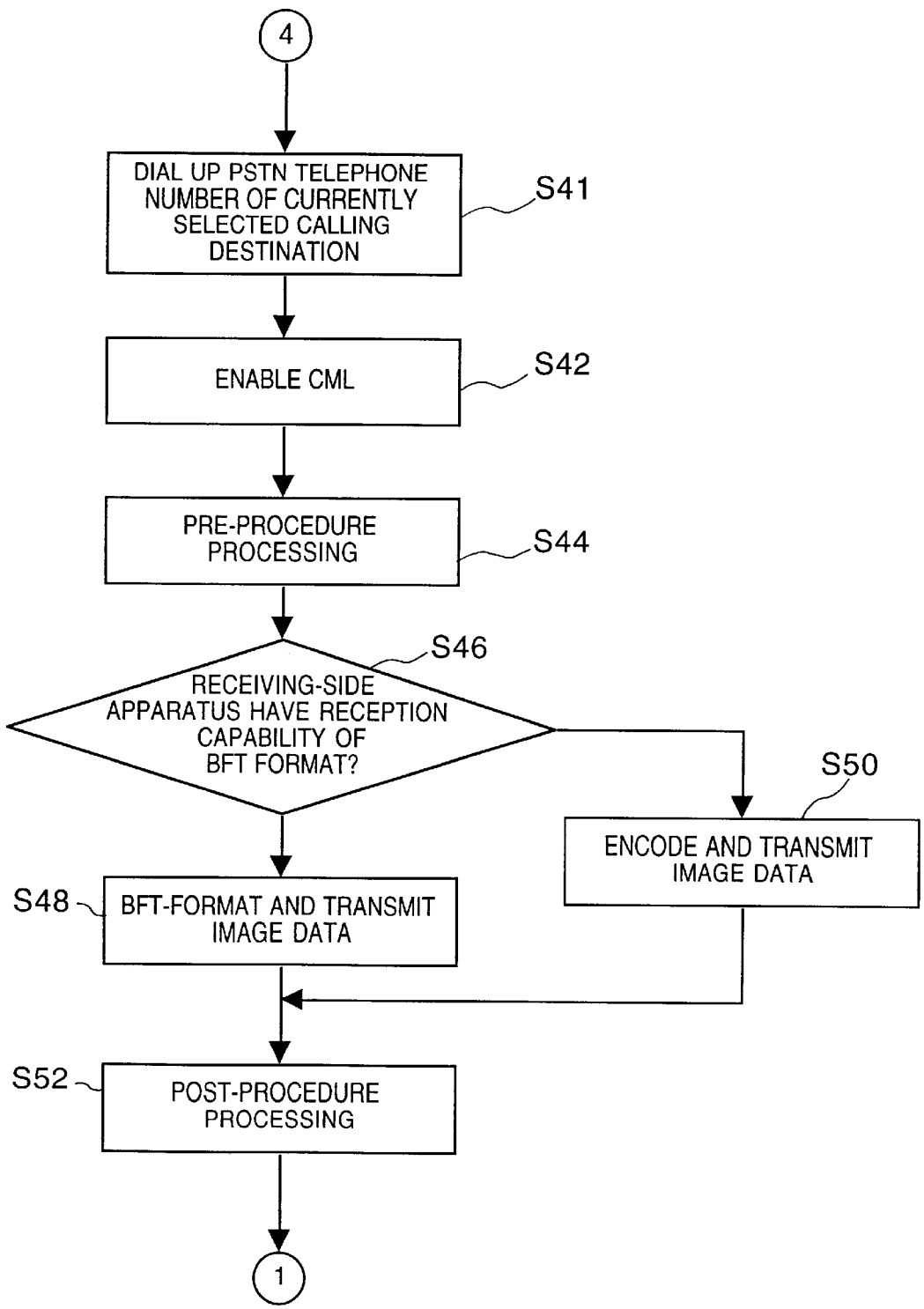
FIG. 6 is a flow chart showing communication network selection control in the control unit according to the embodiment of the present invention.
Figure 7:
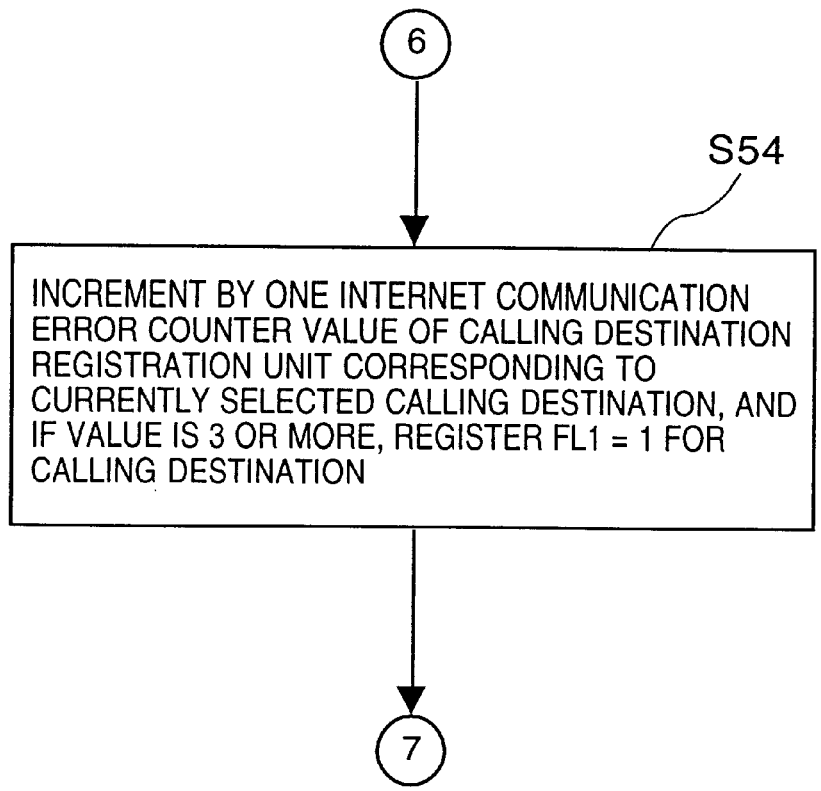
FIG. 7 is a flow chart showing communication network selection control in the control unit according to the embodiment of the present invention.
Figure 8:
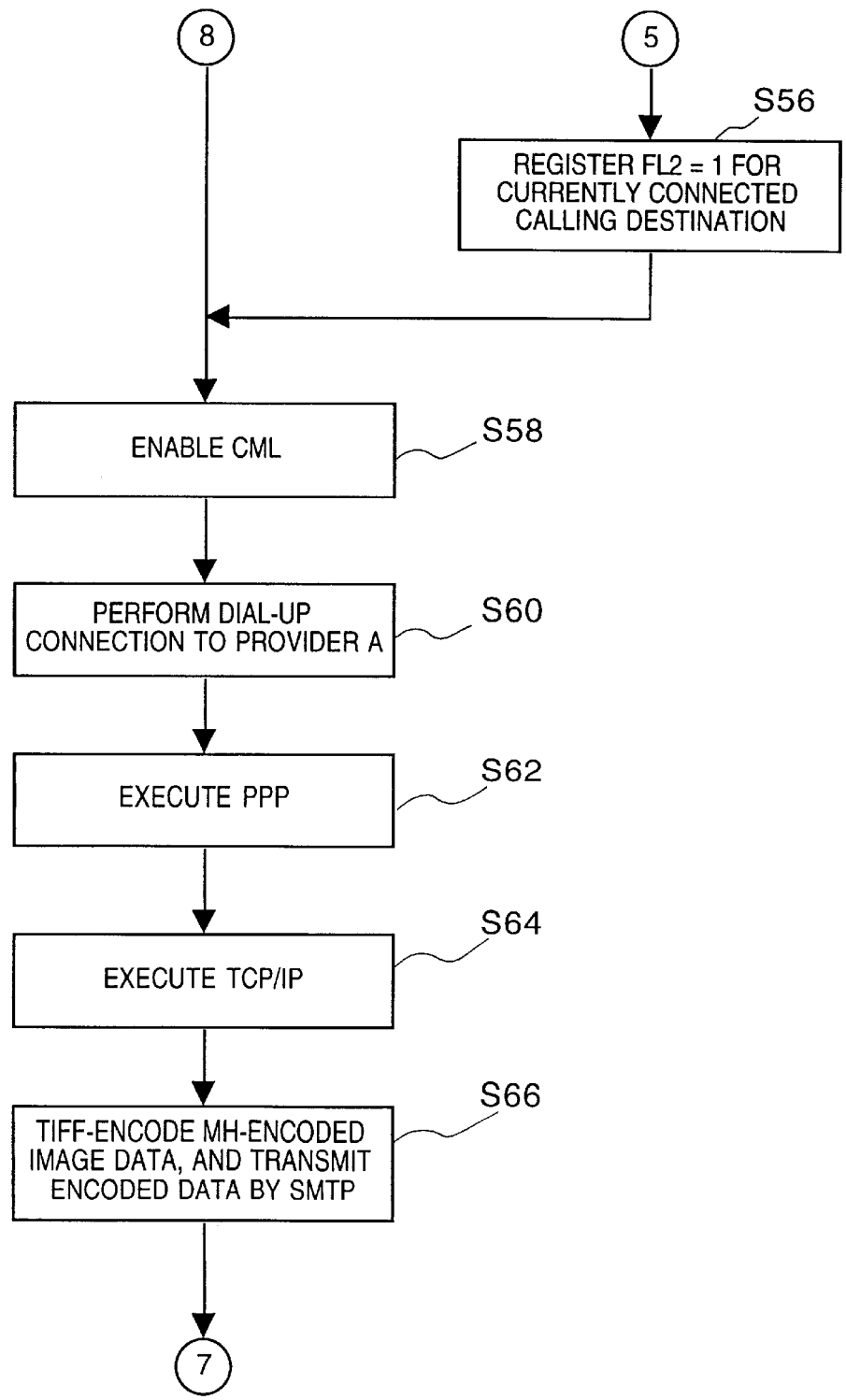
FIG. 8 is a flow chart showing communication network selection control in the control unit according to the embodiment of the present invention.

FIG. 2 is a block diagram showing the arrangement of a provider included in the facsimile system according to the embodiment of the present invention.

In FIG. 2, reference numeral 52 denotes a gateway for connecting the facsimile apparatus to another network organization on the Internet. The facsimile database 54 stores the reception capabilities and reception status information of a plurality of facsimile apparatuses connected to the provider by dial-up operation. Reference numeral 56 denotes a dial-up server for connecting the facsimile apparatus to a client via a modem 62 and PSTN in accordance with a communication protocol such as PPP; 58, a DNS (Domain Name System) server for providing domain name services; and 60, a mail server for storing e-mail and facsimile information transmitted/received using SMTP (Simple Mail Transfer Protocol) as the host protocol of TCP/IP (Transmission Control Protocol/Internet Protocol).

Communication network selection control executed by the CPU of the control unit 20 will be explained with reference to FIGS. 3 to 9.

FIGS. 3 to 9 are flow charts, respectively, showing communication network selection control in the control unit according to the embodiment of the present invention.

Step S2:

The CPU initializes the calling destination registration unit 26 via the signal line 26a.

Step S4:

The CPU outputs a signal of signal level "0" to the signal line 20a to disable CML (Connect Modem to Line).

Step S6:

The CPU outputs a signal of signal level "0" to the signal line 20d to inhibit transmission of any ANSam signal.

Step S8:

The CPU checks on the basis of information on the signal line 24a whether registration of the calling destination in the calling destination registration unit 26 is requested via the operation unit 24. If NO (no registration is requested) in step S8, the CPU advances to step S12.

Step S10:

If YES (registration is requested) in step S8, the CPU registers data about a destination in a call (calling destination) in the calling destination registration unit 26 in correspondence with the one-touch dial (not shown) of the operation unit 24. As an example of data to be registered, a set of "03-3333-1111" as the telephone number of the PSTN, "03-3333-2222" as the telephone number of the Internet provider, and the IP address of the destination are registered. As default values used for communication selection control (to be described below), a flag FL1 for inhibiting Internet communication to the calling destination is set to "0" representing permission of Internet communication, an Internet communication error counter CNT1 which is incremented upon Internet communication is set to "0", and a flag FL2 for inhibiting Internet communication of data converted into a predetermined file format to the calling destination is set to "0" representing permission of Internet communication.

Step S12:

The CPU checks based on information on the signal line 24a whether a call is selected via the operation unit 24. If NO (no call is selected) in step S12, the CPU executes another predetermined processing in step S14.

Step S16:

If YES (call is selected) in step S12, the CPU refers to the calling destination registration unit 26 for the calling destination to which the call is currently selected on the operation unit 24, and checks based on the status of the flag FL1 whether Internet communication to the calling destination is inhibited. If YES (FL1=1: Internet communication is inhibited) in step S16, the CPU advances to step S41 in order to perform facsimile communication using the telephone network.

Step S18:

If NO (FL1=0: Internet communication is permitted) in step S16, the CPU refers to the calling destination registration unit 26 for the calling destination to which the call is currently selected on the operation unit 24, and checks based on the status of the flag FL2 whether Internet communication of data converted into a predetermined file format to the calling destination is inhibited. If YES (FL2=1: conversion is inhibited) in step S18, the CPU advances to step S58 in order to execute facsimile communication without performing any file formatting.

Step S20:

If NO (FL2=0: conversion is permitted) in step S18, the CPU outputs a signal of signal level "1" to the signal line 20a to enable CML.

Step S22:

The CPU refers to the calling destination registration unit 26 for the calling destination to which the call is currently selected, and dials up the telephone number of the provider A in which information about the calling destination is registered.

Steps S24 and S26:

The CPU executes PPP (Point-to-Point Protocol) (step S24) and TCP/IP (step S26)

Step S28:

The CPU formats image data read by the reader unit 14 or image data printed at the printer unit 16 into the BFT (Binary File Transfer) file format, encodes the file-formatted data on the basis of the Tiff (Tag image file format) format, and transmits the encoded image data in accordance with SMTP.

Step S30:

The CPU outputs a signal of signal level "0" to the signal line 20a to disable CML.

Step S32:

The CUP sets the timer to, e.g., 2 min to start measuring the time.

Steps S34 and S36:

The CPU checks whether an error message is received from the calling destination until the timer which has started measuring the time in step S32 counts a predetermined time.

Step S38:

If no error message is received until the timer counts the predetermined time (YES in step S36), the CPU sets to "0" via the signal line 26a the Internet communication error counter CNT1 of the calling destination registration unit 26 pertaining to the currently selected calling destination.

Step S40:

If an error message is received from the calling destination until the timer counts the predetermined time (YES in step S34), the CPU analyzes the received error message. If the CPU analyzes that the currently selected calling destination (target destination) is not found, the CPU advances to step S54; or if the CPU analyzes that the currently selected calling destination has received data but cannot interpret the contents of the received data, the CPU advances to step S56.

Step S41:

The CPU refers to the calling destination registration unit 26 for the calling destination to which the call is currently selected, and dials up the PSTN telephone number registered for the calling destination.

Step S42:

The CPU outputs a signal of signal level "1" to the signal line 20a to enable CML.

Step S44:

The CPU executes predetermined pre-procedure processing.

Step S46:

The CPU obtains, from the facsimile database 54 of the provider, data representing the reception capability of the receiving-side facsimile apparatus B, and checks based on the obtained data whether the partner apparatus has a BFT reception function.

Step S48:

If YES (partner apparatus has reception capability) in step S46, the CPU formats image data to be transmitted into the BFT format, and transmits it.

Step S50:

If NO (partner apparatus does not have reception capability) in step S46, the CPU encodes image data to be transmitted into a predetermined format, and transmits it.

Step S52:

The CPU executes predetermined post-procedure processing.

Step S54:

The CPU increments by one the count value of the Internet communication error counter CNT1 of the calling destination registration unit 26 for the calling destination to which the call is currently selected. If the count value is 3 or more, the CPU registers FL1=1 in order to inhibit Internet communication to the calling destination, and advances to step S41 in order to perform facsimile communication using the telephone network.

Step S56:

The CPU registers FL2=1 in order to inhibit Internet communication of file-formatted data in the calling destination registration unit 26 for the calling destination to which the call is selected. The CPU advances to step S58 in order to execute Internet communication without performing any file formatting.

Step S58:

The CPU outputs a signal of signal level "1" to the signal line 20a to enable CML.

Step S60:

The CPU refers to the calling destination registration unit 26 for the calling destination to which the call is currently selected, and dials up the telephone number of the provider A in which information about the calling destination is registered.

Steps S62 and S64:

The CPU executes PPP (step S62) and TCP/IP (step S64).

Step S66:

The CPU MH-encodes image data read by the reader unit 14 or image data printed at the printer unit 16, encodes the encoded data on the basis of the Tiff (Tag image file format) format, and transmits the encoded image data in accordance with SMTP.

Step S68:

The CPU outputs a signal of signal level "0" to the signal line 20a to disable CML.

Step S70:

The CUP sets the timer to, e.g., 2 min to start measuring the time.

Steps S72 and S74:

The CPU checks whether an error message is received from the calling destination until the timer which has started measuring the time in step S70 counts a predetermined time.

Step S76:

If no error message is received until the timer counts the predetermined time (YES in step S74), the sets to "0" via the signal line 26a the Internet communication error counter CNT1 of the calling destination registration unit 26 pertaining to the currently selected calling destination.

Step S78:

If an error message is received until the timer counts the predetermined time (YES in step S72), the CPU checks whether file-formatted image data is transmitted via the Internet.

Step S80:

If YES (data is transmitted) in step S78, the CPU performs predetermined error processing to return to step S4.

Step S82:

If NO (no data is transmitted) in step S78, the CPU analyzes the received error message. If the CPU analyzes that the currently selected calling destination (target destination) is not found, or that the currently selected calling destination has received data but cannot interpret the contents of the received data, the CPU returns to step S56.

When file-formatted image data is facsimile-communicated via the Internet but cannot reach a target calling destination, communication of even unformatted image data via the Internet may generally fail at high probability. For this reason, when transmission of file-formatted image data via the Internet fails, this embodiment facsimile-communicates the image data using only the PSTN. This realizes economical facsimile communication while minimizing the communication cost.

When the partner apparatus cannot interpret the contents of received data, unformatted image data is facsimile-communicated via the Internet. The Internet can be effectively used to reduce the communication cost, compared to the case of using only the PSTN.

If Internet communication of file-formatted image data or Internet communication of unformatted image data to a given calling destination fails, the communication route is managed by the statuses of FL1 and FL2 for each calling destination in the calling destination registration unit 26 so as not to select the unsuccessful communication route in next and subsequent facsimile communication operations. The transmission time can therefore be shortened.

In facsimile communication using only the PSTN, the reception capability of the partner apparatus can be obtained from the provider to reliably perform communication in real time using the PSTN.

[Other Embodiments]

The object of the present invention is realized even by supplying a storage medium storing software program codes for realizing the functions of the above-described embodiments to a system or apparatus, and causing the computer (or a CPU or MPU) of the system or apparatus to read out and execute the program codes stored in the storage medium.

In this case, the program codes read out from the storage medium realize the functions of the above-described embodiments by themselves, and the storage medium storing the program codes constitutes the present invention.

As a storage medium for supplying the program codes, a floppy disk, hard disk, optical disk, magneto optical disk, CD-ROM, CD-R, magnetic tape, nonvolatile memory card, ROM, or the like can be used.

The functions of the above-described embodiments are realized not only when the readout program codes are executed by the computer but also when the OS (Operating System) running on the computer performs part or all of actual processing on the basis of the instructions of the program codes.

The functions of the above-described embodiments are also realized when the program codes readout from the storage medium are written in the memory of a function expansion board inserted into the computer or a function expansion unit connected to the computer, and the CPU of the function expansion board or function expansion unit performs part or all of actual processing on the basis of the instructions of the program codes.

As has been described above, this embodiment can provide a facsimile apparatus capable of reducing the communication cost by efficiently using the Internet, control method therefor, and computer-readable storage medium.

Note that the facsimile apparatus according to each of the above-described embodiments is connected to the provider by dial-up operation prior to Internet communication. However, the present invention is not limited to this system configuration, and can also be applied to a facsimile apparatus for performing Internet communication via a leased line.

As many apparently widely different embodiments of the present invention can be made without departing from the spirit and scope thereof, it is to be understood that the invention is not limited to the specific embodiments thereof except as defined in the appended claims.

What is claimed is:

1. A facsimile apparatus that performs facsimile communication via Internet, comprising:
    a communication unit, which communicates image data converted into a predetermined file format or unconverted image data via the Internet; and
    a control unit, which changes a data communication form used by said communication unit based on data received from a receiver terminal,
    wherein, when the image data converted into the predetermined file format is communicated via the Internet and the data received from the receiver terminal represents that contents of the image data cannot be interpreted, said control unit changes the data communication form used by said communication unit to communicate with the receiver terminal to a data communication form in which the unconverted image data is transmitted via the Internet.

2. The apparatus according to claim 1, wherein, when the image data converted into the predetermined file format cannot be transmitted to the receiver terminal by communication via the Internet, said control unit changes the data communication form used by said communication unit to communicate with the receiver terminal to a data communication form in which image data not converted into the predetermined file format is transmitted via the Internet.

3. The apparatus according to claim 1, wherein
    said communication unit communicates using a telephone network, and
    when the receiver terminal cannot be detected by communication via the Internet, said control unit changes the data communication form to the receiver terminal used by said communication unit to a data communication form using only the telephone network.

4. The apparatus according to claim 3, wherein the receiver terminal cannot be detected by a predetermined number of communication operations via the Internet, said control unit inhibits communication via the Internet to the receiver terminal in a next and subsequent operations.

5. The apparatus according to claim 3, wherein
    said apparatus further comprises a detection unit, which detects a reception capability of the receiver terminal, and,
    when the data communication form is changed to the data communication form using only the telephone network, said control unit determines based on the reception capability of the receiver terminal detected by said detection unit whether to convert image data to be transmitted into a second predetermined file format.

6. The apparatus according to claim 5, wherein the second predetermined file format is a BFT (Binary File Transfer) format.

7. The apparatus according to claim 1, wherein
    said communication unit communicates using a telephone network, and,
    when the data received from the receiver terminal represents that contents of the image data transmitted via the Internet cannot be interpreted, said control unit changes the data communication form used by said communication unit to communicate with the receiver terminal to a data communication form using only the telephone network.

8. A control method for a facsimile apparatus that performs facsimile communication via Internet, comprising the step of:
    changing a data communication form based on data received from a receiver terminal, such that image data converted into a predetermined file format by the facsimile apparatus or unconverted image is transmitted to the receiver terminal via the Internet,
    wherein, when the image data converted into the predetermined file format is communicated via the Internet and the data received from the receiver terminal represents that contents of the image data cannot be interpreted, the data communication form used by the facsimile apparatus to communicate with the receiver terminal is changed to a data communication form in which the unconverted image data is transmitted via the Internet.

9. The method according to claim 8, wherein, when the image data converted into the predetermined file format cannot be transmitted to the receiver terminal by communication via the Internet, the data communication form used by said communication unit to communicate with the receiver terminal is changed to a data communication form in which image data not converted into the predetermined file format is transmitted via the Internet.

10. The method according to claim 8, wherein
    the facsimile apparatus communicates using a telephone network, and,
    when the receiver terminal cannot be detected by communication via the Internet, the data communication form to the receiver terminal is changed to a data communication form using only the telephone network.

11. A computer-readable storage medium storing a communication program for performing facsimile communication via Internet, the communication program comprising:
    a code of a communication step, in which image data converted into a predetermined file format by a facsimile apparatus or unconverted image data is communicated from the facsimile apparatus to a receiver terminal via the Internet; and a code of a control step, in which a data communication form used in the communication step is changed based on data received from the receiver terminal, wherein, when the image data converted into the predetermined file format is communicated via the Internet in the communication step and the data received from the receiver terminal represents that contents of the image data cannot be interpreted, the control step includes changing the data communication form used by the facsimile apparatus to communicate with the receiver terminal in the communication step to a data communication form in which the unconverted image data is transmitted via the Internet.

12. The medium according to claim 11, wherein the code of the control steps comprises, when the image data converted into the predetermined file format cannot be transmitted to the receiver terminal by communication via the Internet using the code of the communication step, changing the data communication form used by the facsimile apparatus to communicate with the receiver terminal in the communication step to a data communication form in which image data not converted into the predetermined file format is transmitted.

13. The medium according to claim 11, wherein the code of the control step comprises, when the receiver terminal cannot be detected by communication via the Internet using the code of the communication step, changing the data communication form used by the facsimile apparatus to communicate with the receiver terminal used in the communication step to a data communication form using only the telephone network.

* * * * *